(12) United States Patent
Taemmerich et al.

(10) Patent No.: US 7,641,843 B2
(45) Date of Patent: Jan. 5, 2010

(54) METHOD AND DEVICE FOR PRODUCING A DECORATIVE ORNAMENTAL PART WITH SYMBOL IN RELIEF

(75) Inventors: Rolf Taemmerich, Lindenberg (DE); Elmar Bruennel, Lindau/B. (DE)

(73) Assignee: Angell-Demmel GmbH, Lindau/B (DE)

( * ) Notice: Subject to any disclaimer, the term of this patent is extended or adjusted under 35 U.S.C. 154(b) by 686 days.

(21) Appl. No.: 11/188,008

(22) Filed: Jul. 25, 2005

(65) Prior Publication Data

US 2006/0019065 A1 Jan. 26, 2006

(30) Foreign Application Priority Data

Jul. 26, 2004 (DE) ................ 10 2004 036 171

(51) Int. Cl.
*B29B 7/00* (2006.01)
(52) U.S. Cl. .................................. 264/328.7
(58) Field of Classification Search ............... 264/328.7
See application file for complete search history.

(56) References Cited

U.S. PATENT DOCUMENTS 3,743,458 A * 7/1973 Hallauer et al. ............. 425/122
4,466,787 A * 8/1984 Ragir et al. ................. 425/122
4,809,576 A * 3/1989 Bakermans et al. ........... 83/155
4,849,145 A * 7/1989 Hirsch ........................ 264/46.4
5,372,770 A * 12/1994 Machida .................... 264/255
5,800,759 A * 9/1998 Yamazaki et al. ........... 264/163
6,345,432 B1 2/2002 Bauer et al.
2003/0164564 A1* 9/2003 Klotz ......................... 264/2.2

FOREIGN PATENT DOCUMENTS

EP 1044779 A1 10/2000
JP 59202834 A 11/1984

* cited by examiner

*Primary Examiner*—Joseph S. Del Sole
*Assistant Examiner*—Jeremiah Smith
(74) *Attorney, Agent, or Firm*—Browdy and Neimark, PLLC

(57) ABSTRACT

The invention describes a method for producing a decorative ornamental part, eg a control key, having a symbol in relief that is defined by a clearance gap free as far as possible of webs and connections in the frame of the control key, wherein the decorative ornamental part is back-injected with a plastic melt by the plastic injection moulding process. In order to obtain a surface on the visible side of the inner part which is free of traces of clamping and retaining it is proposed: that the production method consists of a cutting operation to produce the clearance gap, that the stamping punch carrying out the cutting operation remains as a place-holder in the cut contour of the clearance gap during the injection operation, and that the subsequent injection operation producing a bond ensures the exact connection of the contour of the cut free inner part to the frame of the ornamental part.

8 Claims, 3 Drawing Sheets

Figure 1:
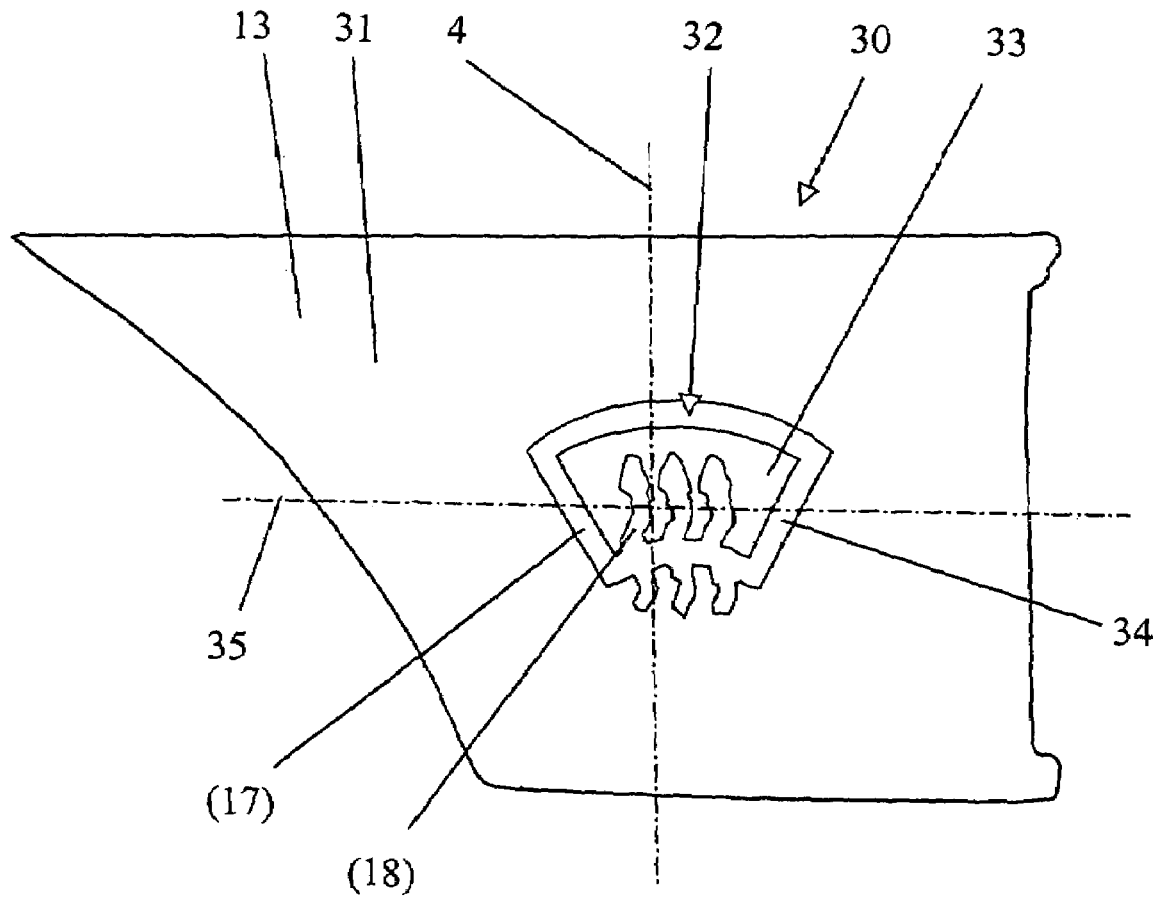

METHOD AND DEVICE FOR PRODUCING A DECORATIVE ORNAMENTAL PART WITH SYMBOL IN RELIEF

The invention relates to a method and a device for producing a decorative ornamental part.

In car interiors nowadays numerous items of equipment having control keys are installed which possess a plastic surface characterised by a conspicuous function symbol. Hitherto such control keys have been produced from pure plastic coated with a laserable lacquer. The function symbols are then transferred onto the surface of the key by laser engraving. As part of the visual evaluation of car interiors the wish has been expressed that these control keys be fitted with a genuine metallic surface whose design can be matched harmoniously to the surfaces of the ornamental parts used.

So far there has not yet been any success in producing this key surface in accordance with customer requirements. Should the development of a suitable production method for such control keys succeed this method will also be transferable to other components having optional elements.

At present metallic surfaces are held in position in the injection mould with the aid of fixing clips. For this purpose as a rule the cleanly cut inner part (symbol) is separated from the outer part and separately fixed in the injection mould. In doing so the accurately fitting introduction of the parts, which may be very small, into the mould is very costly. Nevertheless, due to the high injection pressures and temperatures the fixing clip elements cause pressure and scratch marks on decorative surfaces. In this way the surface of the symbol in relief is damaged in undesirable fashion.

This drawback in the visual area is not accepted by discerning customers. Due to the unacceptable disadvantages of the current state of the art such ornamental parts are made as a rule of lacquered plastic with a lasered symbol contour. Components with a fixing mark are employed only when the fixing point is sufficiently small and the part is positioned far enough away from the viewer.

Accordingly, it is an object of the invention to refine a decorative ornamental part of the type identified at the outset in such a way that the inner part (symbol) located in it has an unmarred surface and this inner part is separated from the remainder of the area of the decorative ornamental part by an all-round clearance free of webs and connections.

A method according to the present invention serves to solve the task set.

The central problem in making a composite component by back-injection technology consists in the positionally accurate fixing of the cut-out elements to be gate-injected with plastic. If in addition decorative components are involved which must not exhibit any pressure and scratch marks on the decorative side, the elements in relief cannot be fixed in the injection mould with the aid of a mandrel or other clamping elements. Furthermore, any displacement of the elements in relief due to lateral forces produced by the flow movement of the gated plastic melt must be reliably prevented. In addition, the gap circumscribing the contour of the element has to be filled and closed with plastic in defined manner in order in this way to produce a back-lightable symbol.

The advantage of the invention is the construction of a (back-lightable, decorative) component on a plastic support, wherein by fixing and back-injecting freely arranged elements having a genuine metallic surface a highly accurate, defined spacing with respect to the surrounding contours is ensured. Due to the mould-related linkage of both processes separate fixing of the inner part (symbol) using dedicated retaining means which touch the surface is no longer necessary.

With reference to the example of a control key for an air-conditioning control device for automobiles a method is presented which allows the production of genuine metallic surfaces having any kind of symbols in relief and defined gap geometry in the form of a plastic-metal composite by back-injection.

The production method basically breaks down into a contour-producing cutting operation with or without superimposed forming to produce a three-dimensional geometry and a subsequent composite-producing injection operation which ensures the precise connection of the contour of the cleanly cut inner part to the outer part in the finished part.

An essential characteristic of the method consists in the common use of the lower part of the mould for the two operations of "cutting free" and "gated injection". Thus, the metal to be back-injected is punched out and if need be formed from the side carrying the visual decoration in the first mould. In doing so the punching waste is pushed into the upper half of the mould. The stamping punch is locked in the extended cutting position and the lower part of the mould containing the inner part fixed by the cutting punch is moved below the upper part of the injection mould.

After the mould has been filled with injection moulding melt the stamping punch is unlocked and withdrawn to a defined extent and the space vacated is likewise filled with injection moulding melt. Through the degree of filling of the mould or control of the holding pressure the degree of filling of the cleavage gap can be varied from underfilling via closure flush with the edge up to distinctly palpable overfilling.

In this way there is the possibility, provided this is desired, of sensing the symbol contour on the finished part in tactile manner. By using a translucent plastic the symbol contour can be back-lit or illuminated by transmitted light.

During the injection process the punching waste is discharged from the upper part of the punching mould which has been opened as part of the method. The common lower part of the mould moves back into the cutting position and the finished part can be ejected from the upper part of the injection mould. Due to the fact that the cut-out inner part after the representative contour has been cut and produced is no longer removed from the mould and even during back-injection the positional fixing is not ended it is possible in this way to produce back-injected parts having an exact contour and position in large volume in continuous industrial production.

In a preferred development of the invention a two-part injection mould is provided that consists of a mould upper part and a mould lower part which is movable relative to the former. The two parts of the mould define the mould cavity.

There are two different embodiments for the operation of such injection moulds for the industrial production of the decorative ornamental parts according to the invention. In a first development it is provided that on a sliding carriage a plurality of mould upper parts arranged with a spacing alongside one another is set up and these are associated with a fixed common lower part. Thus, by means of the lifting sliding carriage the mould upper parts are moved one at a time over a single mould lower part located thereunder so that the forming or subsequently the injection operation can be carried out.

Accordingly, an injection head or a forming head arranged separately from the latter is optionally assigned in each case to one and the same lower part.

In another development of the invention it is provided that instead of a lifting sliding carriage a rotary mould is employed. The individual upper parts of the mould again optionally consisting of a forming tool or an injection mould are fed by rotation to a single mould lower part.

Said mould upper parts assigned to a single mould lower part form part overall of an injection moulding machine having associated mould halves and the corresponding closing pressure between the mould halves of the injection moulding machine is generated in a manner known per se.

The subject matter of the present invention emerges not only from the subject matter of the individual patent claims but also from combinations of the individual patent claims with one another.

All items of information and characteristics disclosed in the documents including the abstract, and in particular the spatial construction illustrated in the drawings, are claimed as essential to the invention to the extent that individually or in combination they are novel with respect to the state of the art.

The invention is explained in more detail below with reference to drawings illustrating only one method of carrying it out. Here other characteristics and advantages of the invention emerge from the drawings and their description.

Figure 2:
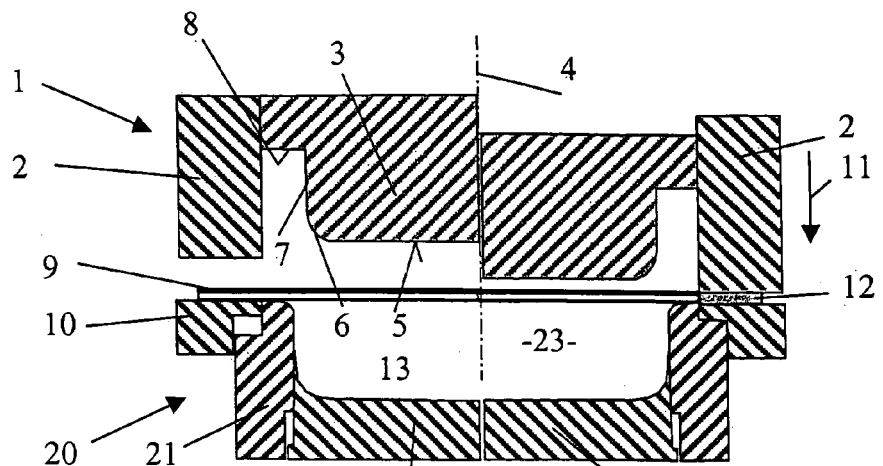
Figure 3:
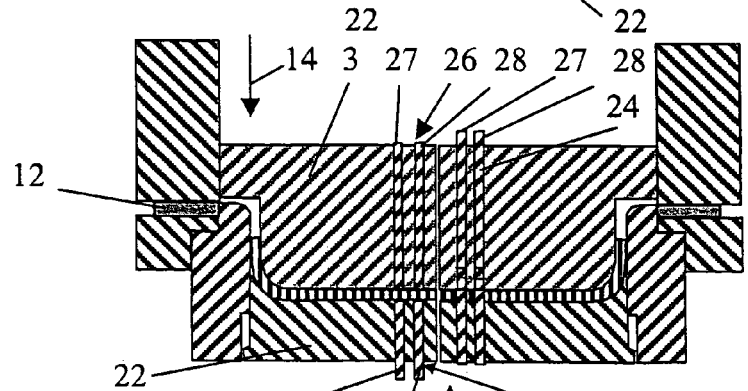
Figure 4:
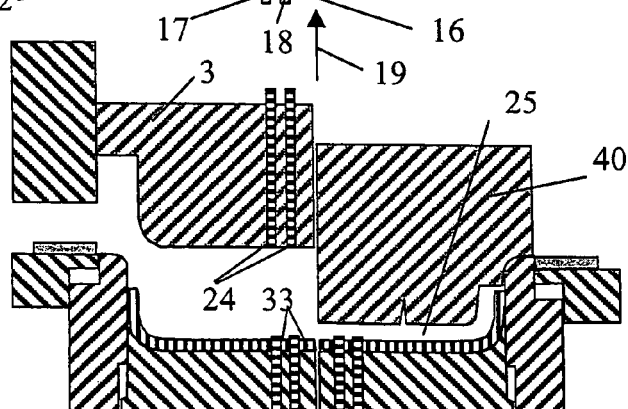
Figure 5:
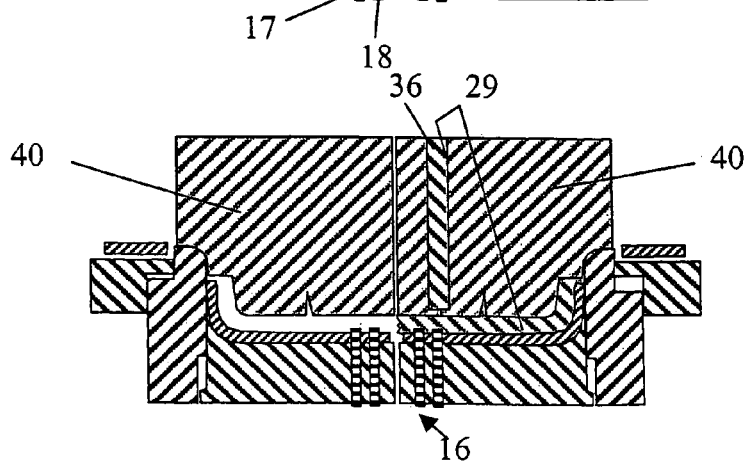
Figure 6:
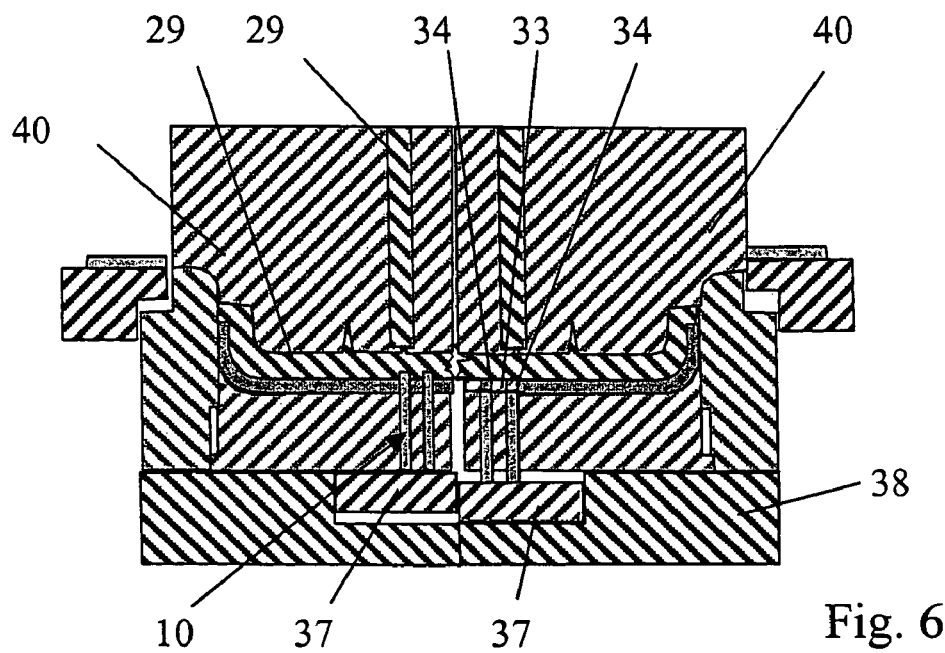
Figure 7:
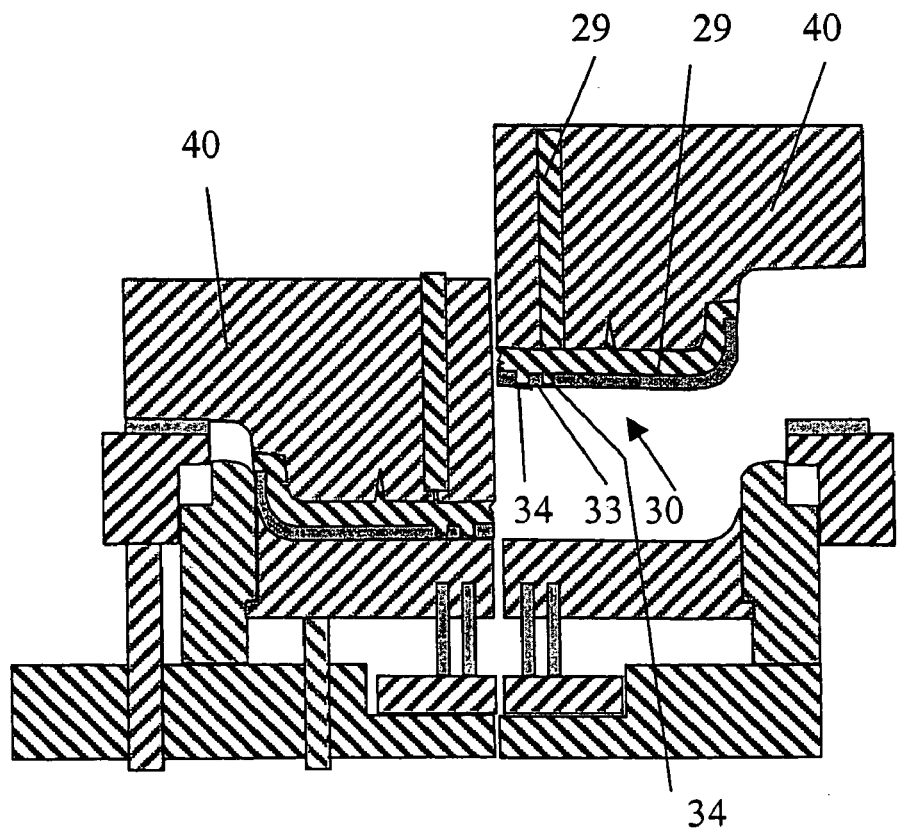

The drawings show:

FIG. 1 plan view onto a decorative ornamental part according to one embodiment of the invention;

FIG. 2 (left and right half section in each case) section through the mould in two different, successive steps in the method;

FIG. 3 (left and right half section in each case) section through the same mould again in two successive steps in the method in each case;

FIG. 4 (left and right half section in each case) further operational sequence of the method between the left and the right half section of the mould;

FIG. 5 left and right half section in each case showing the further operational sequence of the mould;

FIG. 6 (left and right half section in each case) two other procedural sequences in the operation of the mould; and FIG. 7 (left and right half section in each case) two other segments in each case of the operation of the mould according to the invention.

With regard to FIGS. 2 to 7 it should generally be noted that each drawing consists of two half sections and the sequence in time of the operation of the mould has to be read in each case from left to right. Thus, the left half section in FIG. 2 shows a first operating state which after a certain time passes over into the second operating state shown in the right half section of FIG. 2.

The same applies to FIG. 3 where the timing of the left half section directly follows the right half section of FIG. 2 and the right half section of FIG. 3 shows another sequence in the method which in turn, viewed in terms of time, passes over into the left half section of FIG. 4. This is then followed in time by the right half section of FIG. 4. In this fashion the drawings presented in FIGS. 2 to 5 have to be gone through in meandering manner in order to replicate the timed sequence of the operation of the mould according to the invention.

Since the parts in FIGS. 2 to 7 all relate to the same mould the parts identified there are provided only in part with reference numbers. At any rate it is always the case in the drawings that the same part is provided with the same reference number.

With reference to the example of FIG. 1 an explanation will now be given as to how a decorative ornamental part constructed as a control key 30 can be produced by the steps in the method shown in the drawings in FIGS. 2 to 7.

The surface of the control key consists of a lacquered aluminium material which is back-injected on its reverse side with a plastic compound 29.

It is important that in the region of its frame 31 the control key 30 carries an inner part 33 which is set off against the surface 31 by an all-round clearance gap 34. This means that the production problems specified in the general description arise when an attempt is made to connect the completely isolated inner part 33 in the injection operation with a precise all-round clearance gap 34 (with a gap space of narrow tolerance) to the remainder of the body of the control key 30 by means of the plastic melt 29 in the injection moulding process. The web-free, all-round clearance gap 34 then forms the back-lightable symbol 32 of the control key 30.

The dividing plane 35 in FIG. 1 corresponds to the dividing plane through the moulds 1, 20 shown in FIGS. 1 to 7. A half section is illustrated in each case so that the half section line 4 in FIG. 1 corresponds to the half section line 4 in FIGS. 2 to 7.

The mode of operation of the mould according to the invention will now be explained in more detail with reference to FIGS. 2 to 7.

The mould upper part 1 consists of an upper forming punch 3 which for this purpose is movable in the direction of the arrow 14 and in the direction opposite to this. Arranged independently of this is a die 2 which is likewise constructed so that it can move in the direction of the arrow 11 and in the opposite direction. The decorative ornamental part in the form of a blank 9 is inserted in the intervening space between the upper part 1 and the lower part 20 of the mould.

In doing this it is important that the blank 9 consists in a preferred embodiment of a sensitive material, eg a lacquered or brushed metal part or one otherwise exhibiting a contact-sensitive surface.

In particular it is preferred for the blank 9 to consist of a thin aluminium sheet made from an aluminium alloy or in general of a metallic material or of a plastic-metal composite material.

A wooden part could also be used or a plastic-wooden part-metal composite or any combination of the materials identified above.

In the embodiment described below it is important that the visible side 13 of the blank 9 must not be damaged in any way by retaining or clamping means. This applies also to the inner part 33 to be held there which is defined by the all-round clearance gap 34 and must not exhibit any retaining marks, areas of damage or the like on the visible side 13.

As an example of a contour for the forming mould which is variable within broad limits it is specified that the forming contour 5 of the forming punch 3 consists in cross-section of a horizontal line which passes over into a radius 6 which defines the outer contour of the control key. This radius 6 passes over into a straight line 7 defining the forming edge of the part, which straight line 7 in turn passes over into a perpendicularly adjoining forming stop 8 which defines the forming depth of the part.

Attention is drawn to the fact that the forming contour 5 can be completely arbitrary. It can be bent or corrugated and have breaks or the like. The type and construction of the forming contour 5 depends on the nature of the desired shape of the surface of the control key 30.

The mould lower part shown in the left half section in FIG. 2 is formed inter alia by an ejector cushion 22 on whose lateral edge a forming die 21 is movably arranged.

The forming die 21 is constructed to be displaceable relative to the ejector frame 10.

According to the right half section in FIG. 2 the die 2 is moved down in the direction of the arrow 11 in order to trim the edge of the blank 9 as a result of which the waste piece 12 is produced. This is clamped in position between the die 2 and the ejector frame 10.

As the forming punch 3 is moved further into the counter-mould 23 the blank 9 is turned into the shape illustrated in the left half section in FIG. 3.

In this step of the method the stamping punch 16 is driven through the ejector cushion 22 which in the exemplified embodiment shown consists of two stamping parts 17, 18. It is obvious that the construction of the stamping punch with two stamping parts is to be taken only as an example. Thus, the stamping punch may also consist of a leading and trailing part and produce any kind of punched contour.

In FIG. 1 it is indicated by brackets which piece the stamping part 17 cuts out in the all-round clearance gap 34 and which other piece the stamping part 18 cuts out.

Since the half section line 4 relates to symmetrical segments only the two stamping parts 17, 18 on the left of the stamping punch 16 are illustrated here while the right side is constructed exactly the same as and symmetrical to the half section line 4. Thus, in this exemplified embodiment a total of four different stamping parts are employed of which, for the sake of simplicity, only two (that is parts 17 and 18) are shown on the side of the half section in question.

For reasons of simplification the cut of the half section line 4 is not positioned in the centre in order to achieve diagrammatic simplification in the drawings in FIGS. 2 to 7.

Opposite the stamping parts 17, 18 in the left part section in FIG. 3 an ejector 26 is driven into place opposite in the forming punch 3, which ejector consists of the parts 27, 28 whose shape exactly matches the parts to be cut out according to the stamping parts 17, 18.

In the right half section in FIG. 3 the cut is now executed in that the entire stamping punch 16 moves upwards in the direction of the arrow 19 and produces an all-round clearance gap 34 around the inner part 33 so that this inner part 33 is not connected to the remainder of the body 31 of the control key 30 by a web or any other link.

According to the illustration in FIG. 3 (right half section) it is now important that the stamping punch 16 remains in the region of the all-round clearance gap 34. In this way the stamping punch 16 with its stamping parts 17, 18 serves as a place-holder in the all-round clearance gap 34.

According to the left half section in FIG. 3 the cutting took place against the counterpressure of the parts 27, 28 in the ejector 26.

In the right half section in FIG. 3 the punching waste 24 can now be moved upwards into the region of the forming punch 3 as a result of which the ejector 26 is moved upwards.

In the left half section of FIG. 4 the mould upper part 1 is now opened with respect to the mould lower part, the punching waste 24 falls freely downwards and can be ejected. As before it is important for the stamping punch 16 with its stamping parts 17, 18 to remain as a place-holder in the cut-out part of the blank 9.

After the mould upper part 1 has been opened the mould lower part 20 is brought into the injection position and the injection mould upper part 40 is moved downwards so that a mould cavity 25 as shown in the right half section in FIG. 4 results.

It is important that the left half section in FIG. 4 shows the forming tool of the mould upper part, that is to say the forming punch 3, while the right half section in FIG. 4 shows the injection mould upper part 40 which instead of the forming punch 3 is moved into engagement with the mould lower part 20. The aforementioned mould cavity 25 is now formed by this injection mould upper part 40.

This illustration in the right half section in FIG. 4 is retained in the left half section in FIG. 5.

In the transition from the left half section in FIG. 5 to the right half section in FIG. 5 it is now discernable that the injection mould upper part 40 is associated with a gate funnel 36 through which the plastic melt 29 is injected into the mould cavity 25.

It is obvious that the gate funnel 36 does not have to run vertically from above into the upper part 40, rather there is a series of other optional possibilities for arranging such a gate funnel in an injection mould upper part 40.

It is now important when the mould cavity 25 is completely closed and sealed all round for the plastic melt 29 to be injected into the mould cavity with high moulding pressure and to cure accordingly. In doing so it is an essential feature of the invention that the stamping punch 16 remains in the blank 9 as a place-holder so that the central part 33 is held in the mould cavity 25 in dimensionally stable manner absolutely free of displacement. No displacement whatsoever and no warpage take place and no other retaining means are required to hold this inner part 33 without movement in the mould cavity because it is secured in position by the stamping punch 16.

It is obvious that the scope of the present invention includes not only a one-part stamping punch 16, rather the stamping punch may also be of multipart construction and may comprise a plurality of stamping parts 17, 18 and the like. A plurality of stamping punches can also be arranged beside one another and it is not essential to the solution that the stamping punch 16 with its place-holder function necessarily engages in the vertical direction through the mould lower part 20. It could also engage in sloping directions or in a different plane.

In the situation shown in the right half section in FIG. 5 the plastic melt 29 now cures and as a result forms an intimate bond with the inner part 33 which accordingly is securely injected against displacement in the plastic melt.

This situation is illustrated in more detail in the left half section in FIG. 6. It is shown there that the stamping punch 16 is connected to a core puller 37 which in the transition to the right half section in FIG. 6 is displaced so that the stamping punch 16 disengages from the blank 9 and the inner part 33 produced in this way and defined by an all-round clearance gap 34 is now secured against displacement embedded in the plastic mass 29 with clear and defined cut edges.

The advantage of the method according to the invention also lies inter alia in that the stamping punch 16 viewed from the visible side 13 cuts into the blank 9 in order in this way to form the inner part 33 so that no burrs of any kind or other unsightly faults on the visible side of the control key 30 are visible.

The invention, however, is not restricted to this.

In a different development it can indeed be provided that the stamping punch 16 penetrates into the reverse side of the blank 9 in order in this way to bring about an all-round clearance gap 34 in the direction coming out of the visible side 13.

Accordingly, for functional parts or where the burr geometry of the cut edges is no longer visible to the viewer it can indeed be expedient to drive the stamping punch into the blank from the reverse side of the latter.

In the fashion first described a symbol 32 as shown in FIG. 32 is produced which consists of an all-round clearance gap 34 having no webs of any kind or other measures for connection to the surface or the body 31 of the control key 30.

It is important in this case that a transparent (or at least transilluminable) plastic compound 29 be used so that the entire control key 30 is transilluminable from the reverse side and hence the symbol 32 lights up in highly visible manner. This back-lighting capability is also referred to as an implementation in "day-night design".

In the left half section in FIG. 7 basically the same position in the method as in the right half section in FIG. 6 is illustrated once again. It is not shown that other ejectors and like movable parts are present which if need be are arranged in the mould lower part 20.

In the right half section in FIG. 7 it can be seen that the injection mould upper part has now been opened and the finished control key 30 now adhering to the underside is being ejected by an ejector which is not illustrated in further detail.

It is further pointed out that the aforementioned core pullers 37 are arranged in the region of a base plate 38 as part of the mould lower part 20.

The degree of mould filling for the contour of the all-round clearance gap 34 can be controlled by the controlled pulling back of the stamping punch 16 in the transition from the left half section in FIG. 6 to the right half section in FIG. 6.

By means of the appropriate holding pressure when the plastic melt 29 runs into the mould cavity 25 overfilling of the all-round clearance gap 34 can also take place. This means that the symbol can be felt in tactile manner.

Accordingly, it is important in the present invention that a completely freestanding symbol 32 is produced in the region of a body 31 on the control key 30 which symbol is defined by an all-round clearance gap 34 in the body 31. It requires no visually unattractive connecting webs of any kind as previously necessary in the state of the art. Likewise it requires no special retaining means, such as needles or other fixing means for example, which could damage the surface of the symbol 32 or of the inner part 33.

It is likewise important that the frame 31 and the associated inner part 33 separated from it by the all-round clearance gap 34 are not separated from one another during the injection operation, but rather are always positioned relative to one another in a secured position so that there is no risk of displacement of the two parts with respect to one another.

It is no longer necessary to produce the two parts, that is to say the frame 31 and the inner part 33, in separate work steps and to join these to one another by means of the plastic melt 29 only in a subsequent injection process. Such a production method has proved to be disadvantageous because it is not possible to produce the all-round clearance gap 34 and hence the symbol formed by this means with a high degree of accuracy in which all spacings extend uniformly all the way round.

References in the above description to an "all-round clearance gap 34 free of webs and connections" are not to be understood as restricting the scope of protection of the invention.

In many applications it can arise that the cutting tool leaves bridging webs behind as connectors between the (only partly) cut out inner part 33 and the outer, adjoining frame 31. In this case also the advantages of the invention can be exploited for even when the injection pressures are high no deformation of the webs need be feared because the holding force for the inner part (33) is applied by the cutting tool substantially on its own. Thus, to the extent that there are references in the description to an "all-round clearance gap 34 free of webs and connections" these are to be understood as a particularly preferred exemplified embodiment but not as a restriction on the invention.

| Legend to drawings | |
|---|---|
| 1 | Mould upper part |
| 2 | Die |
| 3 | Forming punch |
| 4 | Half section line |
| 5 | Forming contour |
| 6 | Radius |
| 7 | Straight line |
| 8 | Forming stop |
| 9 | Blank |
| 10 | Ejector frame |
| 11 | Direction of arrow |
| 12 | Waste piece |
| 13 | Visible side |
| 14 | Direction of arrow |
| 15 | |
| 16 | Stamping punch |
| 17 | Stamping part |
| 18 | Stamping part |
| 19 | Direction of arrow |
| 20 | Mould lower part |
| 21 | Forming die |
| 22 | Ejector cushion |
| 23 | Countermould |
| 24 | Punching waste |
| 25 | Mould cavity |
| 26 | Ejector |
| 27 | Part |
| 28 | Part |
| 29 | Plastic melt (compound) |
| 30 | Control key |
| 31 | Frame (body) |
| 32 | Symbol |
| 33 | Inner part |
| 34 | All-round clearance gap |
| 35 | Cutting plane |
| 36 | Gate funnel |
| 37 | Core puller |
| 38 | Base plate |
| 39 | |
| 40 | Injection mould upper part |
| 41 | |

The invention claimed is:

1. Method for producing a decorative ornamental part, having a symbol (32) in relief that is defined by a clearance gap (34) free as far as possible of webs and connections in a frame (31) of a control key (30), wherein the decorative ornamental part is back-injected with a plastic melt (29) by a plastic injection moulding process, comprising:
   a cutting operation to produce the clearance gap (34) within the frame (31),
   a stamping punch (16) carrying out a cutting operation remains within the frame (31) as a place-holder in the clearance gap (34) during the injection moulding, and
   the injection moulding is carried out to produce a bond enabling the exact connection of the cut free inner part (33) to the frame (31) of the ornamental part,
   wherein during said injecting moulding, through the degree of filing of the mould cavity (25) or control of holding pressure of the plastic melt (29), the degree of filing of the clearance gap (34) is over filled to a distinctly palpable degree;
   characterised in that in a first work step the decorative ornamental part to be back-injected is punched and optionally formed in a mould (1, 20) from a visible side (13) and in doing so punching waste (24) is pushed into an upper half (1) of the mould,
   that in a second work step the stamping punch (16) is locked in an extended position passing through the frame (31) and a mould lower part with an inner part fixed by the stamping punch is moved under the upper half of the mould, that in a third work step a plastic melt (29) is injected into the mould cavity (25) and the cut free inner part (33) is connected to the reverse side of the frame (31) by the plastic melt (29), and that in a fourth work step after the mould cavity (25) has been filled with plastic melt (29) the stamping punch (16) is unlocked, pulled back to a defined extent and a space liberated comprising the clearance gap (34) is likewise filled with plastic melt (29).

2. Method according to claim 1, characterised in that a mould lower part (20) is used in common for said cutting and said injection moulding.

3. Method according to claim 1, characterised in that an at least partially translucent plastic is used for the plastic melt (29).

4. The method of claim 1, wherein the stamping punch (16) projects into the frame (31) from a female part (22) of an injection mould in which the injection moulding is carried out.

5. A method for producing a control key (30) having a decorative ornamental part with a symbol in relief, where the production method comprises a cutting operation to produce a clearance gap (34) and the decorative ornamental part is back-injected with a plastic melt (29) by a plastic injection moulding process, wherein the symbol in relief (32) is defined by a clearance gap (34) free of webs and connections in a frame or body (31) of the control key (30);

a stamping punch (16) carrying out the cutting operation remains as a place-holder in the clearance gap (34) during the injection moulding process in an injection mould;

in a first work step, the decorative ornamental part to be back-injected by plastic injection moulding is punched and optionally deformed from a decorated visible side (13) in a first tool (1, 20), whereby punching waste (24) is pushed into an upper half of the first tool (1);

in a second work step, a stamping punch (16) is maintained in an extended cutting position passing through the frame or body (31), and a mould lower part with the frame or body (31) fixed by the stamping punch is moved under an upper part of the injection mould;

in a third work step, a plastic melt (29) is injected into a mould cavity (25) and the symbol in relief (32) is connected with the frame or body (31) by plastic melt (29); and in a fourth work step, after the mould cavity (25) has been filled with plastic melt (29), the stamping punch (16) is retracted a defined extent and space liberated by the stamping punch comprising the clearance gap (34) is likewise filled with plastic melt (29), wherein during said injecting moulding, through the degree of filing of the mold cavity (25) or the control of the holding pressure of the plastic melt (29), the degree of filing of the clearance gap (34) is over filled to a distinctly palpable degree.

6. A method in accordance with claim 5, wherein, prior to or at the same time of the cutting operation, forming of a blank (9), forming a precursor of the decorative ornamental part takes place.

7. A method in accordance with claim 5, wherein the mould lower part (20) is used in common for the cutting and injection moulding.

8. A method in accordance with claim 5, wherein at least partially translucent plastic is used for the plastic melt (29).

* * * * *

UNITED STATES PATENT AND TRADEMARK OFFICE
CERTIFICATE OF CORRECTION

| | | |
|---|---|---|
| PATENT NO. | : 7,641,843 B2 | |
| APPLICATION NO. | : 11/188008 | |
| DATED | : January 5, 2010 | |
| INVENTOR(S) | : Taemmerich et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1145 days.

Signed and Sealed this

Sixteenth Day of November, 2010

David J. Kappos
*Director of the United States Patent and Trademark Office*